United States Patent
Yoo (10) Patent No.: US 11,276,141 B2
(45) Date of Patent: Mar. 15, 2022

(54) LIFTING TRANSFORM METHOD AND APPARATUS FOR ELEMENTAL IMAGE ARRAY

(71) Applicant: SANGMYUNG UNIVERSITY INDUSTRY-ACADEMY COOPERATION FOUNDATION, Seoul (KR)

(72) Inventor: Hoon Yoo, Suwon-si (KR)

(73) Assignee: SANGMYUNG UNIVERSITY INDUSTRY-ACADEMY COOPERATION FOUNDATION, Seoul (KR)

( * ) Notice: Subject to any disclaimer, the term of this patent is extended or adjusted under 35 U.S.C. 154(b) by 43 days.

(21) Appl. No.: 16/986,838

(22) Filed: Aug. 6, 2020

(65) Prior Publication Data

US 2021/0158475 A1    May 27, 2021

(30) Foreign Application Priority Data

Nov. 25, 2019  (KR) .......................... 10-2019-0151923

(51) Int. Cl.
*G06T 3/00* (2006.01)
*H04N 13/271* (2018.01)
*G06T 5/00* (2006.01)

(52) U.S. Cl.
CPC .......... *G06T 3/0068* (2013.01); *G06T 3/0056* (2013.01); *G06T 5/006* (2013.01); *H04N 13/271* (2018.05)

(58) Field of Classification Search
CPC ..... G06T 3/0068; G06T 3/0056; G06T 5/006; H04N 13/271; H04N 13/161; H04N 13/232; H04N 19/50; H04N 19/597; H04N 19/61

See application file for complete search history.

(56) References Cited

U.S. PATENT DOCUMENTS

| 10,187,630 | B2 * | 1/2019 | Yoo | .......................... G06T 7/285 |
| 2017/0161912 | A1 * | 6/2017 | Yoo | .......................... G06T 7/285 |

FOREIGN PATENT DOCUMENTS

CN         101600113 A  * 12/2009  ......... H04N 5/23267

OTHER PUBLICATIONS

Dong-Hak Shin and Eun-Soo Kim, "Computational Integral Imaging Reconstruction of 3D Object Using a Depth Conversion Technique," J. Opt. Soc. Korea 12, 131-135 (2008) (Year: 2008).*
Chuo-Ling Chang et al., "Light Field Compression Using Disparity-Compensated Lifting and Shape Adaptation", IEEE Transactions on Image Processing, Apr. 2006, pp. 793-806, vol. 15, No. 4.
Peter Eisert et al., "Automatic Reconstruction of Stationary 3-D Objects from Multiple Uncalibrated Camera Views", IEEE Transactions on Circuits and Systems for Video Technology, Mar. 2000, pp. 261-277, vol. 10, No. 2.

* cited by examiner

*Primary Examiner* — Charles T Shedrick
(74) *Attorney, Agent, or Firm* — Sughrue Mion, PLLC (57) ABSTRACT

A lifting transform method performed on an elemental image array may perform a lifting transform on an elemental image array to obtain a difference image (or an error image representing a prediction error) and movement information used for prediction and may appropriately reorder the difference image to obtain a wavelet-type elemental image array.

19 Claims, 10 Drawing Sheets

OVERLAPPING

FIG. 10

LIFTING TRANSFORM METHOD AND APPARATUS FOR ELEMENTAL IMAGE ARRAY

CROSS-REFERENCE TO RELATED APPLICATIONS

This application claims priority under 35 U.S.C. § 119 to Korean Patent Application No. 10-2019-0151923, filed on Nov. 25, 2019, the disclosure of which is incorporated herein by reference in its entirety.

TECHNICAL FIELD

The present invention relates to an integral imaging technique for imaging and visualizing a three-dimensional (3D) image.

BACKGROUND

An integral imaging technique is a technique for imaging and visualizing a 3D image. The technique was first proposed by Lippmann in 1908. Comparing with stereoscopy and holography, the technique provides white light, full parallax, and a continuous time without using a short-wavelength laser and glasses corresponding to an additional optical device.

Therefore, the integral imaging technique is attracting much attention in various application fields. For example, the technique is attracting much attention in the application fields of 3D object visualization and 3D object recognition, a self-driving vehicle system, and 3D entertainment.

Figure 1A:
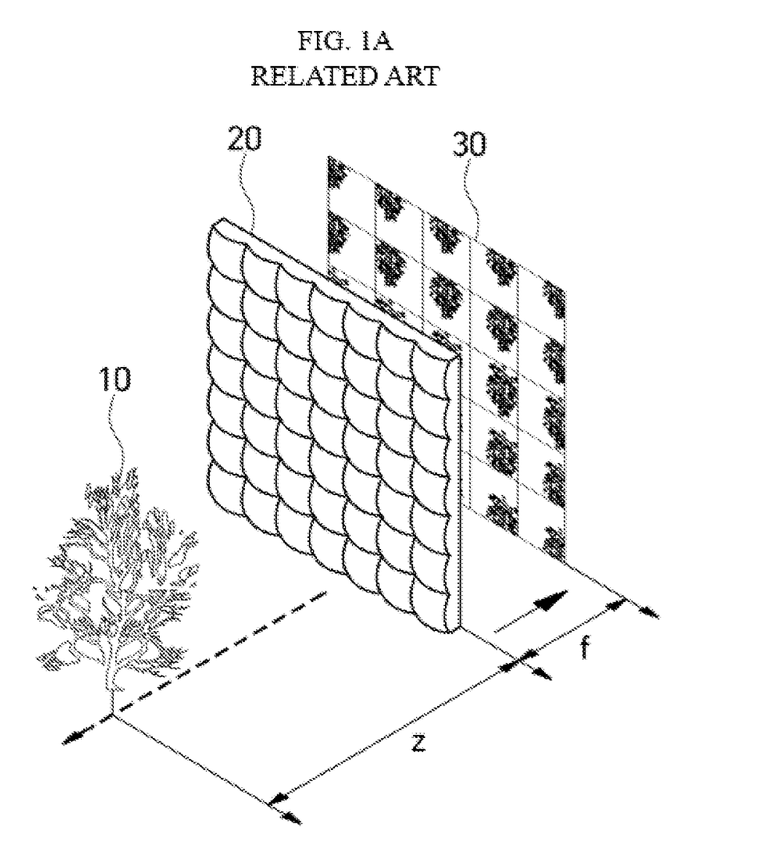
FIG. 1A is a diagram for describing a pickup process performed in a related art integral imaging system.
Figure 1B:
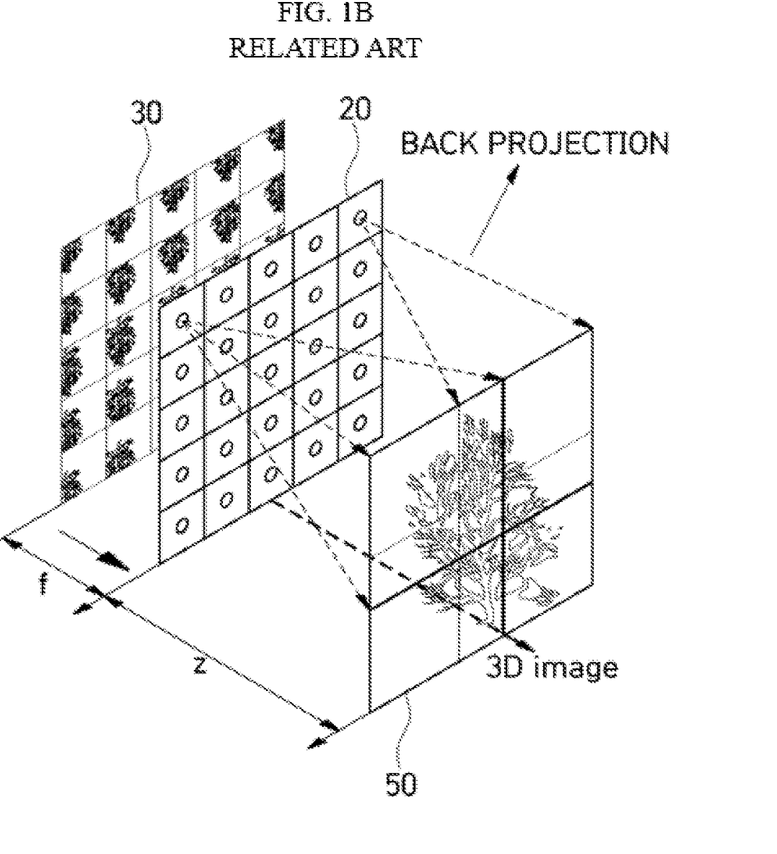
FIG. 1B is a diagram for describing a restoration (reconstruction) process performed in a related art integral imaging system

FIG. 1A is a diagram for describing a pickup process performed in a related an integral imaging system, and FIG. 1B is a diagram for describing a restoration (reconstruction) process performed in a related art integral imaging system.

the related art integral imaging system performs the pickup process and the restoration (reconstruction) process.

Referring to FIG. 1A, in the pickup process, a light ray emanated from a 3D object 10 is captured by a charge-coupled device (CCD) camera via a lens array 20. The pickup process includes a pickup process based on a camera array instead of the lens array 20. An image, which is obtained from a pickup device and has various viewing angles, has a two-dimensional (2D) array structure, and the 2D array structure is referred to as an elemental image array (EIA).

Referring to FIG. 1A, the restoration process restores a 3D image optically or digitally. In optical integral imaging (OII), an EIA is displayed by an optical display panel, and a 3D object is observed through a lens array.

On the other hand, in computational integral imaging (CII), a 3D image is restored (reconstructed) by using a digital technique based on an EIA and a virtual pinhole array 40. Such a restoration (reconstruction) technique is referred to as computational integral imaging reconstruction (CIIR).

Unlike OII, CIIR generates a view image regardless of a physical limitation of an optical device. An image restored by a computer may be used for application fields such as object recognition and depth estimation, and CIIR is very practical.

General CIIR is back-projection. Back-projection is a method where an elemental image is magnified in the middle of passing through the virtual pinhole array 40, and elemental images overlap in a restoration image plane.

CIIR researches for improving image quality is being actively discussed up to date. In the CIIR researches, a pixel mapping method is a pixel mapping method which ray-traces a position, at which each pixel of an elemental image reaches via a pinhole, and maps the traced position to a restoration plane 50. Such a method reduces the number of operations and improves image quality.

A method of encoding image data includes a lifting wavelet transform technique. Technique known to those skilled in the art is applied to a description of the lifting wavelet transform technique.

However, the lifting wavelet transform is divided into three steps (i.e., split, prediction, and update steps), and a prediction filter applied to the prediction step extracts a motion estimation vector of each of reference images for prediction.

Moreover, an update filter applied to the update step extracts a plurality of motions vectors. Parameters extracted in the prediction and update steps are large in amount of data and need a number of arithmetic operations. Such a problem is a factor which hinders efficient coding of an elemental image based on the lifting wavelet transform technique.

SUMMARY

Accordingly, the present invention provides a lifting transform method and apparatus for efficient coding of an elemental image array.

The advantages, features and aspects of the present invention will become apparent from the following description of the embodiments with reference to the accompanying drawings, which is set forth hereinafter.

In one general aspect, a lifting transform method performed on an elemental image array (EIA) includes: splitting, a source EIA 10 into a first reference EIA 10_1 and a first input EIA 10_2 each including no common elemental image; predicting a prediction image $P(d_{min1})$ corresponding to each input elemental image X of the first input EIA 10_2 and generating a first difference image array 10_3 including a difference image between the input elemental image X and the prediction image $P(d_{min1})$; splitting the first reference EIA 10_1 into a second reference EIA 10_4 and a second input EIA 10_5 each including no common elemental image; predicting a prediction image $P(d_{min2})$ corresponding to each input elemental image Y of the second input EIA 10_5 and generating a second difference image array 10_6 including a difference image between the input elemental image Y and the prediction image $P(d_{min2})$; and merging the first and second difference image arrays 10_3 and 10_6 to generate a final difference image array 24.

In another general aspect, a lifting transform method performed on an elemental image array (EIA) includes: splitting, a source EIA 10 into a first reference EIA 10_1 and a first input EIA 10_2 each including no common elemental image; generating first movement information $d_{min1}$ about a plurality of reference elemental images S included in the first reference EIA 10_1 used in a process of predicting a prediction image $P(d_{min1})$ corresponding to each input elemental image X of the first input EIA 10_2; splitting the first reference EIA 10_1 into a second reference EIA 10_4 and a second input EIA 10_5 each including no common elemental image; generating second movement information $d_{min2}$ about a plurality of reference elemental images D included in the second reference EIA 10_4 used in a process of predicting a prediction image $P(d_{min2})$ corresponding to each input elemental image Y of the second input EIA 10_5; and merging the first and second movement information $d_{min1}$ and $d_{min2}$ to generate a disparity map.

In another general aspect, a lifting transform apparatus for an elemental image array (EIA) includes: a first splitter configured to split a source EIA 10 into a first reference EIA 10_1 and a first input EIA 10_2 each including no common elemental image; a first predictor configured to predict a prediction image $P(d_{min1})$ corresponding to each input elemental image X of the first input EIA 10_2 and generate a first difference image array 10_3 including a difference image between the input elemental image X and the prediction image $P(d_{min1})$; a second splitter configured to split the first reference EIA 10_1 into a second reference EIA 10_4 and a second input EIA 10_5 each including no common elemental image; a second predictor configured to predict a prediction image $P(d_{min2})$ corresponding to each input elemental image Y of the second input EIA 10_5 and generate a second difference image array 10_6 including a difference image between the input elemental image Y and the prediction image $P(d_{min2})$; and a merger configured to merge the first and second difference image arrays 10_3 and 10_6 to generate a final difference image array 24.

In another general aspect, a lifting transform apparatus for an elemental image array (EIA) includes: a first splitter configured to split a source EIA 10 into a first reference EIA 10_1 and a first input EIA 10_2 each including no common elemental image: a first predictor configured to generate first movement information $d_{min1}$ about a plurality of reference elemental images S included in the first reference EIA 10_1 used in a process of predicting a prediction image $P(d_{min1})$ corresponding to each input elemental image X of the first input EIA 10_2; a second splitter configured to split the first reference EIA 10_1 into a second reference EIA 10_4 and a second input EIA 10_5 each including no common elemental image; a second predictor configured to generate second movement information $d_{min2}$ about a plurality of reference elemental images D included in the second reference EIA 10_4 used in a process of predicting a prediction image $P(d_{min2})$ corresponding to each input elemental image Y of the second input EIA 10_5; and a merger configured to merge the first and second movement information $d_{min1}$ and $d_{min2}$ to generate a disparity map.

Other features and aspects will be apparent from the following detailed description, the drawings, and the claims.

DETAILED DESCRIPTION OF EMBODIMENTS

Hereinafter, embodiments of the present invention will be described in detail with reference to the accompanying drawings.

The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The present invention may provide an efficient coding method performed on an elemental image array (EIA) obtained by a pickup process. Particularly, the present invention may encode an EIA on the basis of a lifting-based wavelet transform technique corresponding to one technique in an coding process.

In an embodiment of the present invention, explicit information about disparity may not previously be required in performing a lifting-based wavelet transform on an EIA.

Furthermore, in an embodiment of the present invention, although described below in detail, movement information d representing the amount of overlapping reference images may be calculated for optimal prediction in a prediction step, and thus, disparity information (or a disparity map) for depth information may be simultaneously generated.

Hereinafter, a lifting transform method performed on an elemental image array according to an embodiment of the present invention will be described in detail, and a computing device for implementing the present invention will be briefly described.

A computing device for implementing the present invention may include a personal computer (PC), a server computer, a laptop device, a multiprocessor system, a microprocessor-based system, a set-top box, a programmable consumer appliance, a communication network PC, a minicomputer, a mainframe computer, a distributed computing environment including at least one of the systems, and devices similar thereto, but is not limited thereto.

The computing device for implementing the present invention may include a processing unit, a system memory, and a system bus connecting various system elements including the system memory, but is not limited thereto.

The processing unit may be implemented with one or more general-use microprocessors, digital signal processors (DSPs), hardware cores, application specific integrated circuits (ASICs), field programmable gate arrays (FPGAs), or an arbitrary combination thereof.

The system memory may include a computer storage medium having a volatile and/or non-volatile memory device type such as read-only memory (ROM) 131 and random access memory (RAM) 132.

The computer device medium may include RAM, ROM, electrically erasable programmable read-only memory (EEPROM), flash memory, or another memory technology, CD-ROM digital versatile disk (DVD), or another optical disk storage device, magnetic cassette, magnetic tape, magnetic disk storage device, or another magnetic storage device, or another storage medium capable of being used to store desired information and accessed by computers, but is not limited thereto.

The present invention may encode an EIA obtained based on an integral imaging technique by using a lifting-based wavelet transform technique, and thus, the computing device for implementing the present invention may be referred to as an encoder, an encoding device, a transmission device including the encoder or the encoding device, or an image processing device including the transmission device.

The present invention may use the lifting-based wavelet transform technique for encoding an EIA, and thus, the computing device for implementing the present invention may be referred to as a lifting transform apparatus for an EIA.

Hereinafter, a lifting transform method performed on an EIA implemented in a computing device for implementing the present invention will be described in detail.

Figure 2:
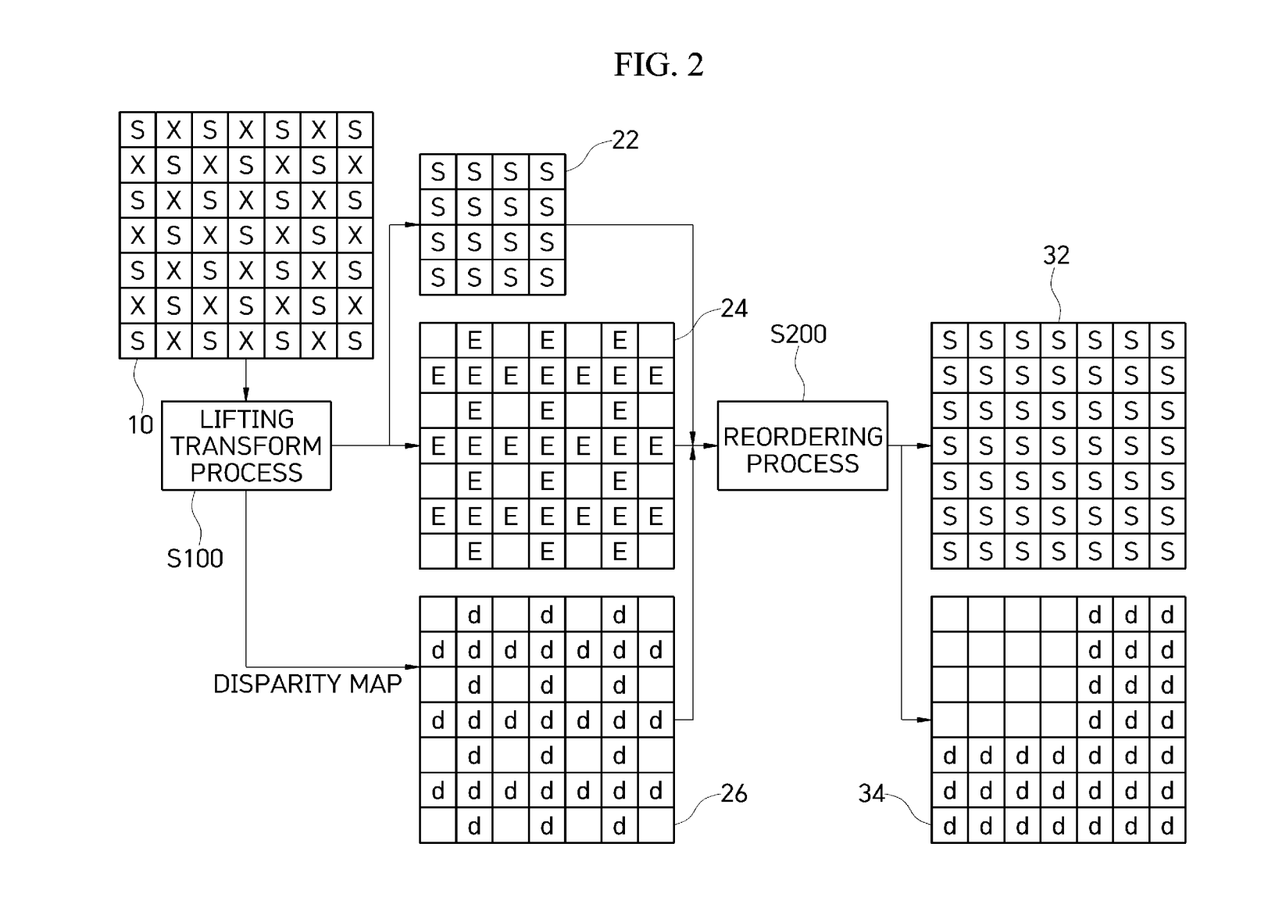
FIG. 2 is a diagram for showing a wavelet-type elemental image array generated based on a lifting transform of an elemental image array according to an embodiment of the present invention.

FIG. 2 is a diagram for showing a wavelet-type EIA generated based on a lifting transform of an EIA according to an embodiment of the present invention.

As illustrated in FIG. 2, in a lifting transform process (S100), an EIA 10 may be input, and a lifting transform process (a lifting-based wavelet transform process) may be performed on the input EIA 10.

The EIA 10 may include a plurality of elemental images arrayed two-dimensionally. One elemental image may be obtained by one lens included in a lens array 20 illustrated in FIG. 1. Therefore, the plurality of elemental images arrayed two-dimensionally may be obtained by a plurality of lenses arrayed two-dimensionally.

By performing the lifting transform process (S100) according to the present invention on the input EIA 10, an EIA 24 including difference images (or error images) generated based on prediction in the lifting transform process (S100) and a disparity map 26 where pieces of movement information d about each elemental image S are two-dimensionally arrayed may be generated (obtained).

In the drawing, difference images may be referred to by E, and such a difference image may be referred to as an error image representing an error of prediction. In addition, an EIA 22 including elemental images which are not used for prediction in the lifting transform process (S100) may be generated (obtained).

In a reordering process (S200) performed after the lifting transform process (S100), the EIAs 22 and 24 and the disparity map 26 generated through the lifting transform process (S100) may be appropriately reordered, and thus, a plurality of wavelet-type EIAs 32 and 34 may be obtained.

Hereinafter, a lifting transform process (S100) illustrated in FIG. 2 will be described in detail with reference to FIG. 3.

Figure 3:
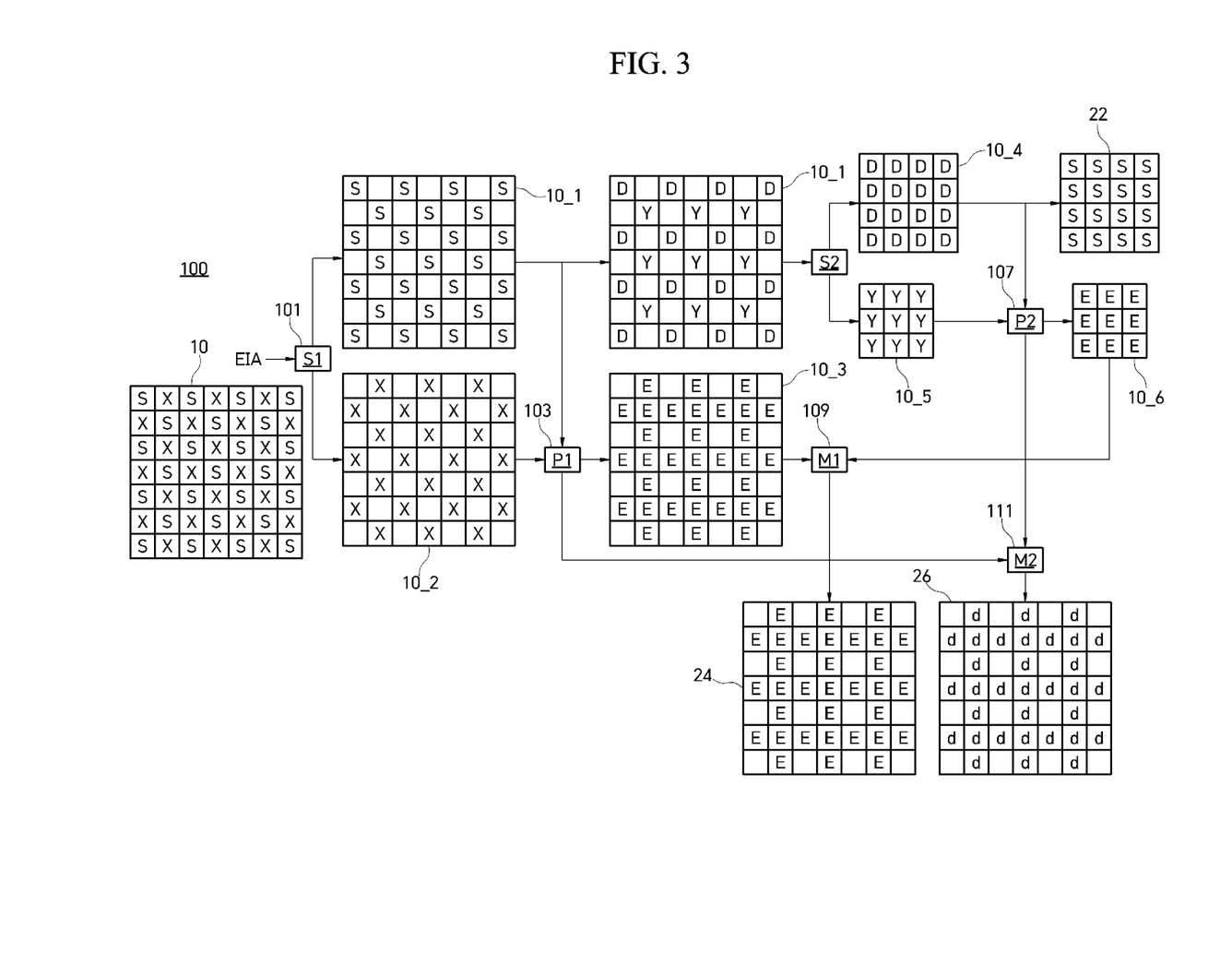
FIG. 3 is a diagram illustrating an internal configuration of a lifting transform apparatus for performing a lifting transform process illustrated in FIG. 2.

FIG. 3 is a diagram illustrating an internal configuration of a lilting transform apparatus for performing the lifting transform process (S100) illustrated in FIG. 2.

Referring to FIG. 3, a lifting transform apparatus 100 according to an embodiment of the present invention may include a plurality of modules, for performing a lifting transform on an EIA 10. Each of the plurality of modules may be implemented as a software module, executed by an appropriate processing unit including at least one processor (a central processing unit (CPU)) or/and a graphics processing unit (GPU)), or a logic circuit or a hardware module included in the processing unit.

As illustrated in FIG. 3, the plurality of modules may include a first splitter (S1) 101, a first predictor (P1) 103, a second splitter (S2) 105, a second predictor (P2) 107, a first merger (M1) 109, and a second merger (M2) 109.

First Splitter 101

The first splitter 101 may split an EIA 10 (hereinafter referred to as a source EIA) into two EIAs 10_1 and 10_2 including no common elemental image.

For example, the first splitter 101 may extract odd-numbered elemental images S and even-numbered elemental images X from the source EIA 10 to split the source EIA 10 into the two EIAs 10_1 and 10_2.

Each of elemental images included in one of the two ETAs 10_1 and 10_2 may be used as a reference image in a prediction process performed by the first predictor 103.

In an embodiment of the present invention, it may be assumed that the elemental images S included in the EIA 10_1 split from the source EIA 10 are used as reference images, and based on such assumption, the EIA 10_1 may be referred to as a reference EIA 10_1 and each elemental image S included in the reference EIA 10_1 may be referred to as a reference image.

Hereinafter, in order to differentiate the EIA 10_2 from the reference EIA 10_1, one other EIA 10_2 split from the source EIA 10 may be referred to as an input EIA 10_2, and each elemental image X included in the input EIA 10_2 may be referred to as an input elemental image.

First Predictor 103

The first predictor 103 may generate a plurality of prediction images P(d) corresponding to each input elemental image X included in the input EIA 10_2 by using the reference elemental images S, included in the reference EIA 10_1 input from the first splitter 101, as reference images.

Moreover, the first predictor 103 may determine a prediction image $P(d_{min1})$ where difference energy representing a difference between corresponding input elemental images X among a generated plurality of prediction images $P(d_1)$ is lowest and may generate a difference image (or an error image) E representing a difference between the input elemental image X and the determined prediction image $P(d_{min1})$.

Such a difference image may be generated from each of all input elemental images included in the input EIA 10_2, and thus, the first predictor 103 may generate a difference image array 10_3 where a plurality of difference images E corresponding to all input elemental images are two-dimensionally arrayed and may input the difference image array 10_3 to the first merger (M1) 109.

Moreover, the first predictor 103 may input movement information $d_{min1}$, representing the amount of movement of each of the reference elemental images S used to generate the prediction image $P(d_{min1})$, to the second merger (M2) 111.

The first predictor 103 will be described below in more detail with reference to FIG. 4.

Figure 4:
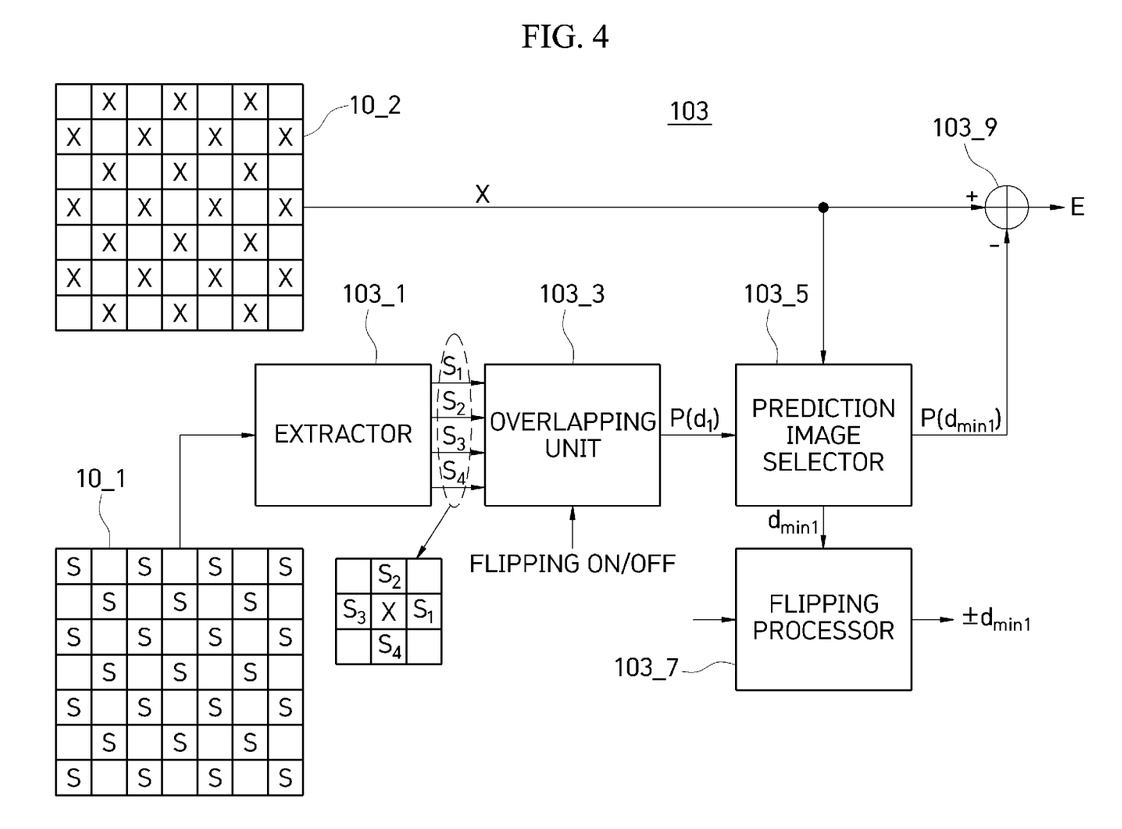
FIG. 4 is a diagram illustrating an internal configuration of a first predictor illustrated in FIG. 3.
Figure 5A:
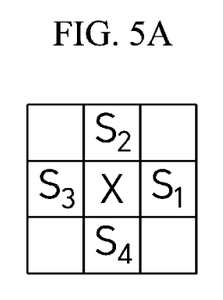
FIGS. 5A and 5B are diagrams for describing a method of extracting reference elemental images from a reference elemental image array by using the first predictor illustrated in FIG. 3.
Figure 5B:
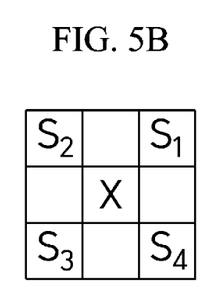
Figure 6:
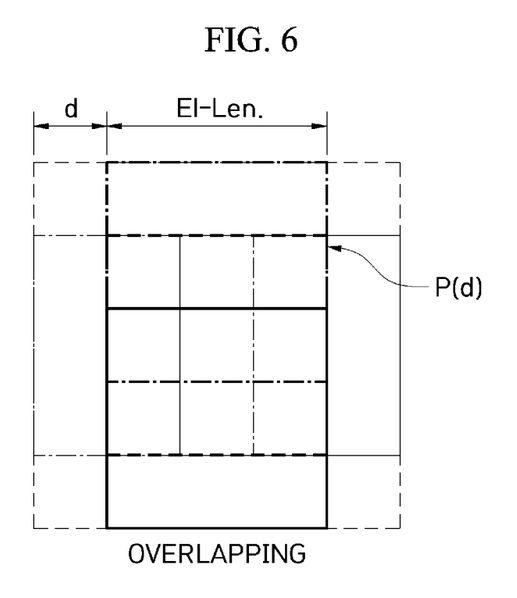
FIG. 6 is a diagram illustrating the amount of movement of reference elemental images arrayed as a cross type, according to an embodiment of the present invention.

FIG. 4 is a diagram illustrating an interval configuration of the first predictor 103 illustrated in FIG. 3. FIGS. 5A and 5B are diagrams for describing a method of extracting reference elemental images from a reference EIA by using the first predictor 103 illustrated in FIG. 3. FIG. 6 is a diagram illustrating the amount of movement of reference elemental images arrayed as a cross type, according to an embodiment of the present invention.

Referring to FIG. 4, the first predictor 103 may include an extractor 103_1, an overlapping unit 103_3, a prediction image selector 103_5, a flipping processor 103_7, and a difference image generator 103_9.

The extractor 103_1 may extract a plurality of reference elemental images S, which are to be used as reference images, from a reference EIA 10_1 input from the first splitter (S1) 101 illustrated in FIG. 3. In an embodiment of the present invention, an example where the extractor 103_1 extracts four reference elemental images $S_1$ to $S_4$ will be described below, but the present embodiment is not limited thereto.

A method of extracting the reference elemental images S from the reference EIA 10_1 may be divided into two methods on the basis of the arrangement type of the elemental images S disposed near each elemental image X included in an input EIA 10_2 input from the first splitter (S1) 101 of FIG. 3.

In a first method, as illustrated in FIG. 5A, four elemental images $S_1$ to $S_4$ arrayed as a cross type with respect to each elemental image X may be extracted from the reference EIA 10_1.

In a second method, as illustrated in FIG. 5B, four elemental images $D_1$ to $D_4$ arrayed as a diagonal type with respect to each elemental image X may be extracted as reference elemental images from the reference EIA 10_1.

In the present embodiment, a two-time prediction process may be performed by two predictors 103 and 107. The predictor 103 performing first prediction may generate a prediction image P(d) by using the four reference elemental images $S_1$ to $S_4$, arrayed as a cross type, as reference images, and the predictor 107 performing second prediction may generate a prediction image P(d) by using the four reference elemental images $D_1$ to $D_4$ arrayed as a diagonal type.

The reason that the predictor 103 performing the first prediction uses the four elemental images S, arrayed as a cross type, as reference images is for an accuracy of a prediction result.

A predictor may move reference elemental images S or on the basis of the amount of movement determined within a limited range and may allow the moved four reference elemental images S or D to overlap, thereby generating a prediction image $P(d_1)$ to $P(d_2)$.

In this case, four reference elemental images S arrayed as a cross type may be disposed closer to one another than our reference elemental images D arrayed as a diagonal type, and thus, the four reference elemental images S arrayed as a cross type may be less in amount of movement for overlapping than the four reference elemental images D arrayed as a diagonal type.

In order to obtain an accurate prediction image, the amount of movement of reference elemental images may need to be small. Therefore, in order for the first predictor 103 to obtain an accurate prediction image, the four reference elemental images $S_1$ to $S_4$ arrayed as a cross type may be used as reference images for obtaining the prediction image $P(d_1)$.

Although described below, the second predictor 107 may use the four reference elemental images $D_1$ to $D_4$, arrayed as a diagonal type, as reference images for obtaining the prediction image $P(d_1)$.

When extraction of the four reference elemental images $S_1$ to $S_4$ is completed, the overlapping unit 103_3 may allow the four reference elemental images $S_1$ to $S_4$ to overlap (or to be merged with one another), thereby generating the prediction image P(d).

In detail, as illustrated in FIG. 6, the overlapping unit 103_3 may move positions of the four reference elemental images S on the basis of the amount of movement d determined within a limited range, and then, may allow the moved four reference elemental images S to overlap, thereby generating the prediction image P(d).

In this case, the moved four reference elemental images S may be masked by a mask window, and then, the masked four reference elemental images S may overlap. Here, the mask window may use a 2D-Gaussian window, but is not limited thereto and may use a pyramid-type linear window which is relatively simpler.

As described above, since the prediction image F(d) is generated through overlapping of the moved reference elemental images $S_1$ to $S_4$ on the basis of the amount of movement d determined within a limited range, the overlapping unit 103_3 may generate a plurality of prediction images $P(d_1)$.

Here, the limited range may have 0 as a minimum value and may have an elemental-image length EI-Len as a maximum value. The elemental-image length EI-Len may be a widthwise length or a lengthwise length.

Moreover, the overlapping unit 103_3 may allow reference elemental images $S_1$ to $S_4$ flipped based on a flipping processing command (Flipping On) to overlap, thereby generating a plurality of prediction images $P(d_1)$.

Here, a flipped reference elemental image may denote a reversed image obtained by reversing a reference elemental image. Some or all of the reference elemental images $S_1$ to $S_4$ may be flipped reference elemental images.

The prediction image selector 103_5 may select the prediction image $P(d_{min1})$, where difference energy with the input elemental image X is lowest, from among the plurality of prediction images $P(d_1)$ input from the overlapping unit 103_3.

Moreover, the prediction image selector 103_5 may determine the amount of movement of each of the reference elemental images $S_1$ to $S_4$, used to generate the prediction image $P(d_{min1})$, as the amount of movement $d_{min1}$ of when the difference energy is lowest. The amount of movement $d_{min1}$ may be determined as expressed in the following Equation 1.

$$d_{min} = \arg\min |X - P(d)|^2 \qquad \text{[Equation 1]}$$

The amount of movement $d_{min1}$ determined in a process of selecting the prediction image $P(d_{min1})$ may be used as overhead information. In that the prediction image $P(d_{min1})$ may be used as the overhead information, the overhead information may be referred to as movement information. The amount of movement $d_{min1}$ may be input to the second merger (M2) 111 illustrated in FIG. 3.

When some or all of the reference elemental images $S_1$ to $S_4$ used to generate the selected prediction image $P(d_{min1})$ are filliped images, the flipping processor 103_7 may mark a negative sign (−) indicating that the amount of movement $d_{min1}$ input from the prediction image selector 103_5 represents the amount of movement of each of the flipped reference elemental images $S_1$ to $S_4$ and may input, as movement information, the negative-sign-marked amount of movement $\pm d_{min1}$ to the second merger 111 illustrated in FIG. 3.

The difference image generator 103_9 may generate a difference image F representing a difference between one input elemental image X extracted from the input EIA 10_2 and the selected prediction image P($d_{min1}$) input from the prediction image selector 103_5.

A process of generating the difference image E may be repeatedly performed on all input elemental images included in the input EIA 10_2. Therefore, the difference image generator 103_9 may generate a plurality of difference images E corresponding to the number of all input elemental images.

The plurality of difference images E generated in this manner may be included in the 2D-arrayed difference image array 10_3 and may be input to the first merger (M1) 109.

Second Splitter (S2) 105

Referring again to FIG. 3, the second splitter 105 may again split the reference EIA, 10_1, split from the source EIA 10 by the first splitter 101, into two EIAs 10_4 and 10_5 including no common elemental image.

For example, similarly to a splitting method of the first splitter 101, the second splitter 105 may extract cold-numbered elemental images D and even-numbered elemental images Y from the reference EIA 10_1 to split the reference EIA 10_1 into the EIA 10_4 including the extracted odd-numbered elemental images D and the other EIA 10_5 including the extracted even-numbered elemental images X.

However, unlike the reference EIA 10_1 split by the first splitter 101, the EIA 10_4 may not include a region which is empty between the elemental images D. Therefore, a size of the EIA 10_4 may decrease to be equal to a half size of the reference EIA 10_1.

Likewise, unlike the input EIA 10_2 split by the first splitter 101, the other EIA 10_5 may not include a region which is empty between the elemental images Y. Therefore, a size of the EIA 10_4 may decrease to be equal to a half size of the input EIA 10_2.

The elemental images D included in the EIA 10_4 split from the reference EIA 10_1 by the second splitter 105 may be used as reference images for generating a prediction image corresponding to each element image Y of the EIA 10_5 in the second predictor 107.

Therefore, the EIA 10_4 may be referred to as a reference EIA, and the EIA 10_5 may be referred to as a 2 input EIA.

Second Predictor (P2) 107

The second predictor 107 may perform a prediction process which is almost the same as that of the first predictor described above.

Figure 7:
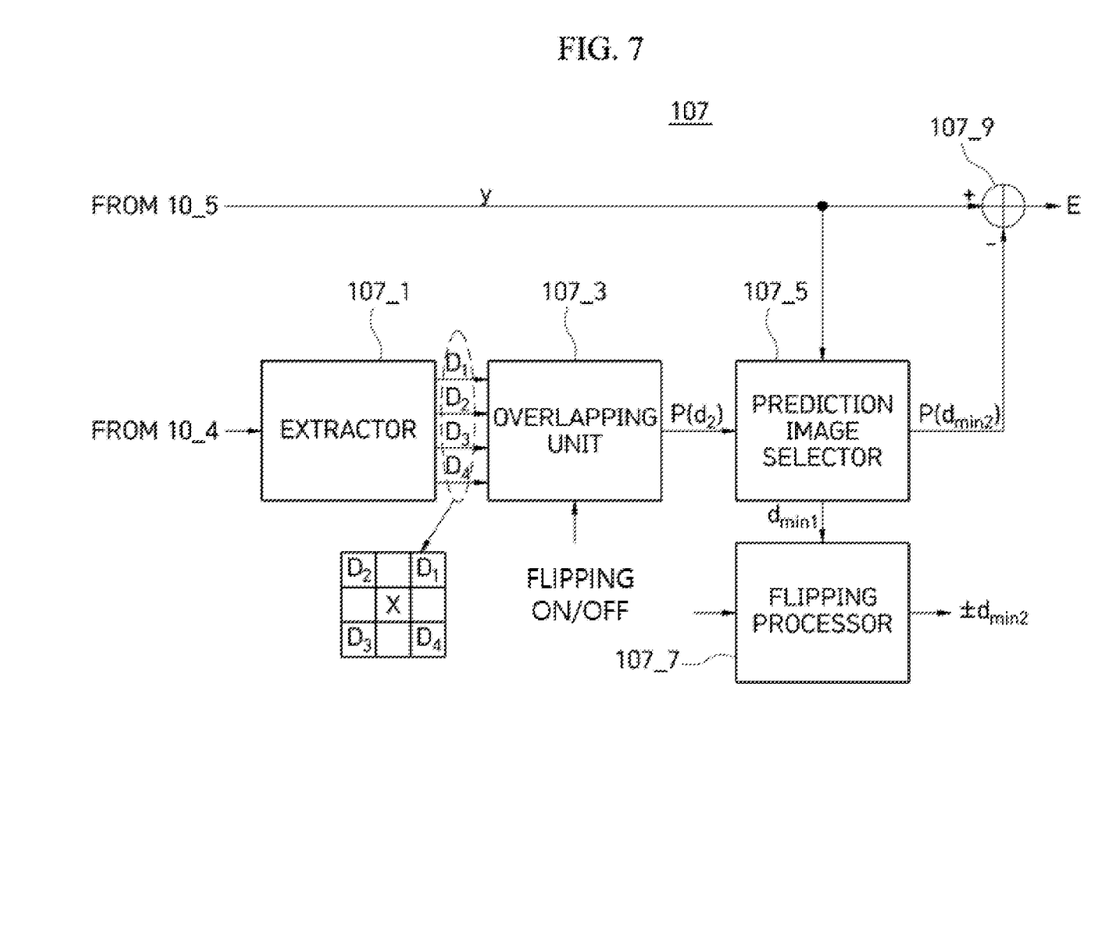
FIG. 7 is a diagram illustrating an internal configuration of a second predictor illustrated in FIG. 3.
Figure 8:
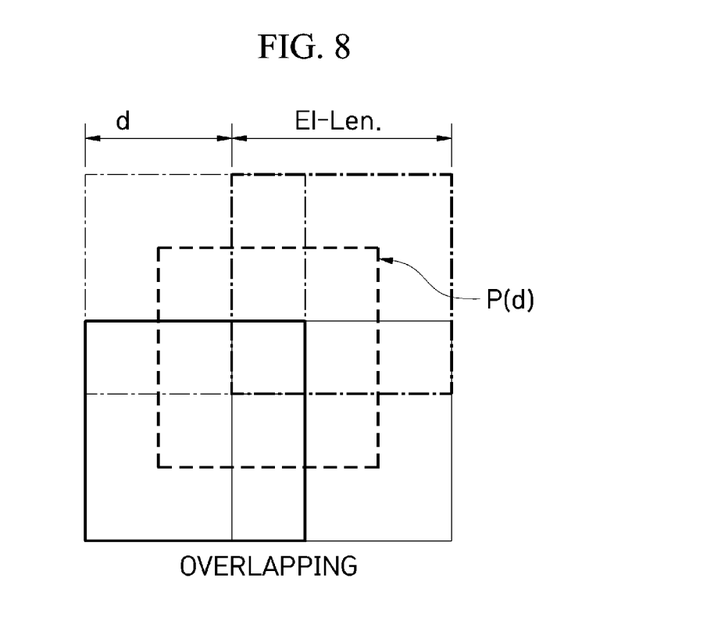
FIG. 8 is a diagram illustrating the amount of movement of reference elemental images arrayed as a diagonal type, according to an embodiment of the present invention.

FIG. 7 is a diagram illustrating an internal configuration of the second predictor 107 illustrated in FIG. 3, and FIG. 8 is a diagram illustrating the amount of movement of reference elemental images arrayed as a diagonal type, according to an embodiment of the present invention.

Referring to FIG. 7, the second predictor 107 may include an extractor 107_1, an overlapping unit 107_3, a prediction image selector 107_5, a flipping processor 107_7, and a difference image generator 107_9.

The elements 107_1 to 107_9 may respectively perform the same processing processes as those of the elements 103_1 to 103_9 included in the first predictor 103. Therefore, the descriptions of elements 103_1 to 103_9 may be applied to the elements 107_1 to 107_9.

The extractor 107_1 included in the second predictor 107 may extract a plurality of reference elemental images $D_1$ to $D_4$, arrayed as a diagonal type with respect to each input elemental image Y of the input EIA 10_5, from the reference EIA 10_4, and in this respect, the extractor 107_1 may have a difference with the extractor 103_1 included in the first predictor 103.

As the extractor 107_1 extracts the reference elemental images $D_1$ to $D_4$ arrayed as a diagonal type, the overlapping unit 107_3 included in the second predictor 107 may move the reference elemental images $D_1$ to $D_4$ arrayed as a diagonal type on the basis of the amount of movement determined within a limited range and then may allow the moved reference elemental images $D_1$ to $D_4$ to overlap, thereby generating a plurality of prediction images P($d_2$). In this respect, the overlapping unit 107_3 may have a difference with the overlapping unit 103_3 included in the first predictor 103.

A prediction image selected by the predictor image selector 107_5 included in the second predictor 107 may be referred to by P($d_{min2}$), and the amount of movement of each of the reference elemental images $S_1$ to $S_4$ used to generate the prediction image P($d_{min1}$) may be referred to by $d_{min2}$.

First Merger (M1) 109

Referring again to FIG. 3, the first merger 109 may merge the difference image array 10_3, input from the first predictor 103, with the difference image array 10_6 input from the second predictor 107 to generate a merged difference image array 24. Here, for example, merging may be a process of filling difference images included in the difference image array 10_6 into an empty region of the difference image array 10_3.

Second Merger (M2) 111

The second merger 111 may merge movement information d, including the amount of movements $d_{min}$ obtained, whenever a prediction image corresponding to each input elemental image X is generated, in a prediction process of the first predictor 103, with movement information d including the amount of movements $d_{min}$ obtained whenever a prediction image corresponding to each input elemental image Y is generated in a prediction process of the second predictor 107, thereby generating the disparity map 26 where the pieces of movement information d are two-dimensionally arrayed.

Reference elemental images, which are nor used in the prediction process of each of the first and second predictors 103 and 107, may be generated as the EIA 22.

The disparity map 26, including the movement information d obtained one by one for each of EIA 22, the difference image array 24, and each input elemental image which are finally obtained by the lifting transform apparatus according to an embodiment of the present invention and are not used in a prediction process, may be appropriately arrayed through the reordering process (S200) illustrated in FIG. 2, and the reordered EIAs 32 and 34 may be transferred to a decoder included in a receiving end.

As described above, a lifting transform of an EIA according to an embodiment of the present invention may not previously require disparity information and may provide the movement information d for ensuring optimal prediction in a prediction process, thereby enabling the movement information d to be used as depth information.

Moreover, the lifting transform of an elemental image array according to the embodiments of the present invention may remove an update step from a conventional lifting transform including three steps (for example, a split step, a prediction step, and an update step), thereby improving the efficiency of an arithmetic operation.

Moreover, in a conventional lifting technique or a video compression method such as H.264/H.265, a motion estimation vector is extracted from each of four reference images, and thus, a number of parameters are additionally stored and transmitted, causing an increase in the number of arithmetic operations.

On the other hand, in the lifting transform of an elemental image array according to the embodiments of the present invention, only one piece of movement information d may be obtained in a process of generating a prediction image corresponding to each elemental image, and thus, the amount of data to be stored or transmitted may be reduced, thereby decreasing the number of arithmetic operations.

Figure 9:
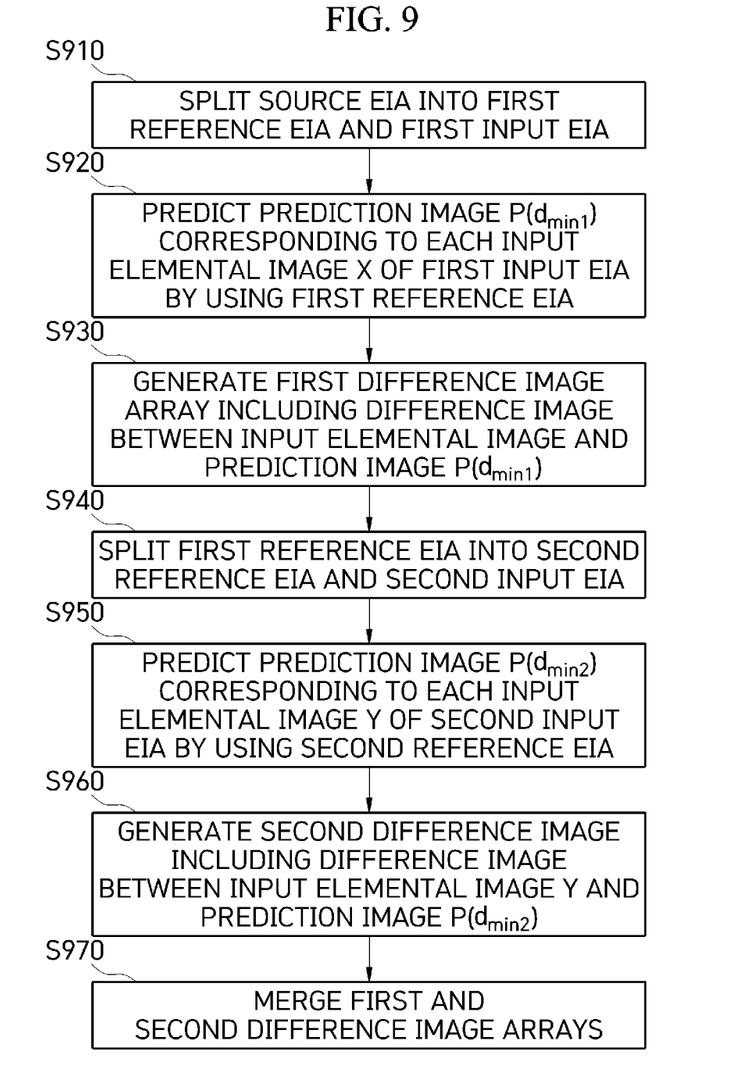
FIG. 9 is a flowchart illustrating a lifting transform method performed on an elemental image array, according to an embodiment of the present invention.

FIG. 9 is a flowchart illustrating a lifting transform method performed on an elemental image array, according to an embodiment of the present invention.

Referring to FIG. 9, the lifting transform method performed on an elemental image array according to an embodiment of the present invention may represent a method associated with obtaining a difference image array 24.

First, in step S910, a process of splitting a source EIA 10 into a first reference EIA 10_1 and a first input EIA 10_2 each including no common elemental image may be performed by the first splitter (S1) 101.

Subsequently, in step S920, a process of predicting a prediction image $P(d_{min1})$ corresponding to each input elemental image X of the first input EIA 10_2 by using the first reference EIA 10_1 may be performed by the first predictor (P1) 103.

The process (S920) may include a process of extracting a plurality of reference elemental images S, disposed near the input elemental image X, from the first reference EIA 10_1, a process of moving the plurality of reference elemental images S on the basis of the amount of movement determined within a limited range and allowing the reference elemental images S moved based on the amount of movement to overlap, thereby generating a plurality of prediction images $P(d_1)$, a process of selecting a prediction image, where difference energy with the input elemental image X is lowest, from among the plurality of prediction images $P(d_1)$, and a process of predicting the selected prediction image as a prediction image $P(d_{min1})$.

The extracting process may be, for example, a process of extracting the reference elemental images S, arrayed as a cross type with respect to the input elemental image X, from the first reference EIA 10_1.

The process of generating the plurality of prediction images $P(d_1)$ may include, for example, a process of flipping the reference elemental images S and a process of allowing the flipped reference elemental images S to overlap.

In this case, the flipped reference elemental images S may be a plurality of reversed images obtained by reversing the reference elemental images S.

Subsequently, in step S930, a process of generating the first difference image array 10_3 including a difference image between the input elemental image X and the prediction image $P(d_{min1})$ may be performed by the first predictor (P1) 103.

Subsequently, in step S940, a process of splitting the first reference EIA 10_1 into a second reference EIA 10_4 and a second input EIA 10_5 each including no common elemental image may be performed by the second splitter (S2) 105.

Subsequently, in step S950, a process of predicting a prediction image $P(d_{min2})$ corresponding to each input elemental image Y of the second input EIA 10_5 by using the second reference EIA 10_4 may be performed by the second predictor (P2) 107.

The process (S950) may include a process of extracting a plurality of reference elemental images D, disposed near the input elemental image Y, from the second reference EIA 10_4, a process of moving the reference elemental images D on the basis of the amount of movement determined within a limited range and allowing the reference elemental images D moved based on the amount of movement to overlap, thereby generating the plurality of prediction images $P(d_2)$, a process of selecting a prediction image, where difference energy with the input elemental image Y is lowest, from among the plurality of prediction images $P(d_2)$, and a process of predicting the selected prediction image as the prediction image $P(d_{min2})$.

Here, the process of extracting the reference elemental images D from the second reference EIA 10_4 may be, for example, a process of extracting the reference elemental images D, arrayed as a diagonal type with respect to the input elemental image Y, from the second reference EIA 10_4.

Subsequently, in step S960, a process of generating the second difference image 10_6 including a difference image between the input elemental image Y and the prediction image $P(d_{min2})$ may be performed by the second predictor (P2) 107.

Subsequently, in step S970, a process of merging the first and second difference image arrays 10_3 and 10_6 to generate a final difference image array 24 may be performed by the first merger (M1) 109.

Figure 10:
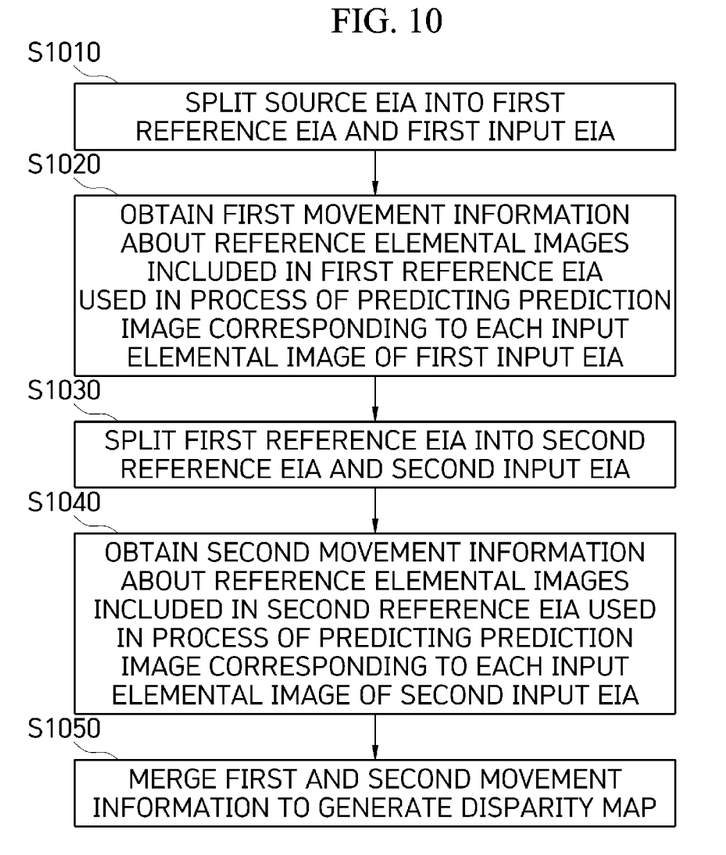
FIG. 10 is a flowchart illustrating a lifting transform method performed on an elemental image array, according to an embodiment of the present invention.

FIG. 10 is a flowchart illustrating a lifting transform method performed on an elemental image array, according to an embodiment of the present invention.

Referring to FIG. 10, the lifting transform method performed on an elemental image array according to an embodiment of the present invention may represent a method associated with obtaining a difference image array 26.

First, in step S1010, a process of splitting a source EIA 10 into a first reference EIA 10_1 and a first input EIA 10_2 each including no common elemental image may be performed by the first splitter (S1) 101.

Subsequently, in step S1020, a process of obtaining first movement information $d_{min1}$ about a plurality of reference elemental images S included in the first reference EIA 10_1 used in a process of predicting a prediction image $P(d_{min1})$ corresponding to each input elemental image X of the first input EIA 10_2, may be performed by the first predictor (P1) 103.

The process (S1020) may include a process of extracting the reference elemental images S, disposed as a cross type with respect to the input elemental image X, from the first reference EIA 10_1, a process of moving the reference elemental images S on the basis of the amount of movement determined within a limited range and allowing the reference elemental images S moved based on the amount of movement to overlap, thereby generating a plurality of prediction images $P(d_1)$, a process of selecting a prediction image $P(d_{min1})$, where difference energy with the input elemental image X is lowest, from among the plurality of prediction images $P(d_1)$, and a process of generating, as the first movement information $d_{min1}$, the amount of movements of the reference elemental images S used to generate the selected prediction image $P(d_{min1})$.

Subsequently, in step S1030, a process of splitting the first reference EIA 10_1 into a second reference EIA 10_4 and a second input EIA 10_5 each including no common elemental image may be performed by the second splitter (S2) 105.

Subsequently, in step S1040, a process of obtaining second movement information $d_{min2}$ about a plurality of reference elemental images D included in the second reference EIA 10_4 used in a process of predicting a prediction image $P(d_{min2})$ corresponding to each input elemental image Y of the second input EIA 10_5 may be performed by the second predictor (P2) 107.

The process (S1040) may include a process of extracting a plurality of reference elemental images D, disposed as a diagonal type with respect to the input elemental image Y, from the first reference EIA 10_1, a process of moving the plurality of reference elemental images D on the basis of the amount of movement determined within a limited range and allowing the reference elemental images D moved based on the amount of movement to overlap, thereby generating a plurality of prediction images $P(d_2)$, a process of selecting a prediction image $P(d_{min2})$, where difference energy with the input elemental image Y is lowest, from among the plurality of prediction images $P(d_2)$, and a process of generating, as the second movement information $d_{min2}$, the amount of movements of the reference elemental images D used to generate the selected prediction image $P(d_{min2})$.

Subsequently, in step S1050, a process of merging the first and second movement information and $d_{min1}$ and $d_{min2}$ to generate a disparity map may be performed by the second merger (M2) 111.

A lifting transform of an elemental image array according to the embodiments of the present invention may not previously require disparity information and may provide the movement information d for ensuring optimal prediction in a prediction process, thereby enabling the movement information d to be used as depth information.

Moreover, the lifting transform of an elemental image array according to the embodiments of the present invention may remove an update step from a conventional lifting transform including three steps for example, a split step, a prediction step, and an update step), thereby improving the efficiency of an arithmetic operation.

Moreover, in a conventional lifting technique or a video compression method such as H.264/H.265, a motion estimation vector is extracted from each of four reference images, and thus, a number of parameters are additionally stored and transmitted, causing an increase in the number of arithmetic operations. On the other hand, in the lifting transform of an elemental image array according to the embodiments of the present invention, only one piece of movement information d may be obtained in a process of generating a prediction image corresponding to each elemental image, and thus, the amount of data to be stored or transmitted may be reduced, thereby decreasing the number of arithmetic operations.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A lifting transform method performed on an elemental image array (EIA), the lifting transform method comprising:
    splitting a source EIA 10 into a first reference EIA 10_1 and a first input EIA 10_2 each including no common elemental image;
    predicting a prediction image $P(d_{min1})$ corresponding to each input elemental image X of the first input EIA 10_2 and generating a first difference image array 10_3 including a difference image between the input elemental image X and the prediction image $P(d_{min1})$;
    splitting the first reference EIA 10_1 into a second reference EIA 10_4 and a second input EIA 10_5 each including no common elemental image;
    predicting a prediction image $P(d_{min2})$ corresponding to each input elemental image Y of the second input EIA 10_5 and generating a second difference image array 10_6 including a difference image between the input elemental image Y and the prediction image $P(d_{min2})$; and
    merging the first and second difference image arrays 10_3 and 10_6 to generate a final difference image array 24.

2. The lifting transform method of claim 1, wherein, in the generating of the first difference image array 10_3,
    the predicting of the prediction image $P(d_{min1})$ comprises:
    extracting a plurality of reference elemental images S, disposed near the input elemental image X, from the first reference EIA 10_1;
    moving the plurality of reference elemental images S on the basis of the amount of movement determined within a limited range and allowing the plurality of reference elemental images S moved based on the amount of movement to overlap, thereby generating a plurality of prediction images $P(d_1)$; and
    selecting a prediction image, where difference energy with the input elemental image X is lowest, from among the plurality of prediction images $P(d_1)$ and predicting the selected prediction image as a prediction image $P(d_{min1})$.

3. The lifting transform method of claim 2, wherein the extracting comprises extracting the plurality of reference elemental images S, arrayed as a cross type with respect to the input elemental image X, from the first reference EIA 10_1.

4. The lifting transform method of claim 2, wherein the generating of the plurality of prediction images $P(d_1)$ comprises:
    flipping the plurality of reference elemental images S; and
    allowing the flipped plurality of reference elemental images S to overlap.

5. The lifting transform method of claim 3, wherein the flipped plurality of reference elemental images S are a plurality of reversed images obtained by reversing the plurality of reference elemental images S.

6. The lifting transform method of claim 1, wherein, in the generating of the second difference image array 10_6,
    the predicting of the prediction image $P(d_{min2})$ comprises:
    extracting a plurality of reference elemental images D, disposed near the input elemental image Y, from the second reference EIA 10_2;
    moving the plurality of reference elemental images D on the basis of the amount of movement determined within a limited range and allowing the plurality of reference elemental images D moved based on the amount of movement to overlap, thereby generating a plurality of prediction images $P(d_2)$; and
    selecting a prediction image, where difference energy with the input elemental image Y is lowest, from among the plurality of prediction images $P(d_2)$ and predicting the selected prediction image as a prediction image $P(d_{min2})$.

7. The lifting transform method of claim 6, wherein the extracting comprises extracting the plurality of reference elemental images D, arrayed as a diagonal type with respect to the input elemental image Y, from the second reference EIA 10_4.

8. A lifting transform method performed on an elemental image array (EIA), the lifting transform method comprising:
  splitting a source EIA 10 into a first reference EIA 10_1 and a first input EIA 10_2 each including no common elemental image;
  generating first movement information $d_{min1}$ about a plurality of reference elemental images S included in the first reference EIA 10_1 used in a process of predicting a prediction image $P(d_{min1})$ corresponding to each input elemental image X of the first input EIA 10_2;
  splitting the first reference EIA 10_1 into a second reference EIA 10_4 and a second input EIA 10_5 each including no common elemental image;
  generating second movement information $d_{min2}$ about a plurality of reference elemental images D included in the second reference EIA 10_4 used in a process of predicting a prediction image $P(d_{min2})$ corresponding to each input elemental image Y of the second input EIA 10_5; and
  merging the first and second movement information $d_{min1}$ and $d_{min2}$ to generate a disparity map.

9. The lifting transform method of claim 8, wherein the generating of the first movement information $d_{min1}$ comprises:
  extracting the plurality of reference elemental images S, disposed as a cross type with respect to the input elemental image X, from the first reference EIA 10_1;
  moving the plurality of reference elemental images S on the basis of the amount of movement determined within a limited range and allowing the plurality of reference elemental images S moved based on the amount of movement to overlap, thereby generating a plurality of prediction images $P(d_1)$;
  selecting a prediction image $P(d_{min1})$, where difference energy with the input elemental image X is lowest, from among the plurality of prediction images $P(d_1)$; and
  generating, as the first movement information $d_{min1}$, the amount of movements of the plurality of reference elemental images S used to generate the selected prediction image $P(d_{min1})$.

10. The lifting transform method of claim 8, wherein the generating of the second movement information $d_{min2}$ comprises:
  extracting the plurality of reference elemental images D, disposed as a diagonal type with respect to the input elemental image Y, from the first reference EIA 10_1;
  moving the plurality of reference elemental images D on the basis of the amount of movement determined within a limited range and allowing the plurality of reference elemental images D moved based on the amount of movement to overlap, thereby generating a plurality of prediction images $P(d_2)$;
  selecting a prediction image $P(d_{min2})$, where difference energy with the input elemental image Y is lowest, from among the plurality of prediction images $P(d_2)$; and
  generating, as the second movement information $d_{min2}$, the amount of movements of the plurality of reference elemental imams D used to generate the selected prediction image $P(d_{min2})$.

11. A lifting transform apparatus for an elemental image array (EIA), the lifting transform apparatus comprising:
  a first splitter configured to split a source EIA 10 into a first reference EIA 10_1 and a first input EIA 10_2 each including no common elemental image;
  a first predictor configured to predict a prediction image $P(d_{min1})$ corresponding to each input elemental image X of the first input EIA 10_2 and generate a first difference image array 10_3 including a difference image between the input elemental image X and the prediction image $P(d_{min1})$;
  a second splitter configured to split the first reference EIA 10_1 into a second reference EIA 10_4 and a second input EIA 10_5 each including no common elemental image;
  a second predictor configured to predict a prediction image $P(d_{min2})$ corresponding to each input elemental image of the second input EIA 10_5 and generate a second difference image array 10_6 including a difference image between the input elemental image Y and the prediction image $P(d_{min2})$; and
  a merger configured to merge the first and second difference image arrays 10_3 and 10_6 to generate a final difference image array 24.

12. The lifting transform apparatus of claim 11, wherein the first predictor comprises:
  an extractor configured to extract a plurality of reference elemental images S, disposed near the input elemental image X, from the first reference EIA 10_1;
  an overlapping unit configured to move the plurality of reference elemental images S on the basis of the amount of movement determined within a limited range and allow the plurality of reference elemental images S moved based on the amount of movement to overlap, thereby generating a plurality of prediction images $P(d_1)$; and
  an prediction image selector configured to select a prediction image, where difference energy with the input elemental image X is lowest, from among the plurality of prediction images $P(d_1)$ and predict the selected prediction image as a prediction image $P(d_{min1})$.

13. The lifting transform apparatus of claim 12, wherein the extractor extracts the plurality of reference elemental images S, arrayed as a cross type with respect to the input elemental image X, from the first reference EIA 10_1.

14. The lifting transform apparatus of claim 12, wherein, based on a flipping processing command, the overlapping unit flips the plurality of reference elemental images S moved based on the amount of movement and allows the flipped plurality of reference elemental images S to overlap.

15. The lifting transform apparatus of claim 11, wherein the second predictor comprises:
  an extractor configured to extract a plurality of reference elemental images D, disposed near the input elemental image Y, from the second reference EIA 10_2;
  an overlapping unit configured to move the plurality of reference elemental images D on the basis of the amount of movement determined within a limited range and allow the plurality of reference elemental images D moved based on the amount of movement to overlap, thereby generating a plurality of prediction images $P(d_2)$; and
  a prediction image selector configured to select a prediction image, where difference energy with the input elemental image Y is lowest, from among the plurality of prediction images $P(d_2)$ and predict the selected prediction image as a prediction image $P(d_{min2})$.

16. A lifting transform apparatus for an elemental image array (EIA), the lifting transform apparatus comprising:
  a first splitter configured to split a source EIA 10 into a first reference EIA 10_1 and a first input EIA 10_2 each including no common elemental image;
  a first predictor configured to generate first movement information $d_{min1}$ about a plurality of reference elemental images S included in the first reference EIA 10_1 used in a process of predicting a prediction image $P(d_{min1})$ corresponding to each input elemental image X of the first input EIA 10_2;

a second splitter configured to split the first reference EIA 10_1 into a second reference EIA 10_4 and a second input EIA 10_5 each including no common elemental image;

a second predictor configured to generate second movement in $d_{min2}$ about a plurality of reference elemental images included in the second reference EIA 10_4 used in a process of predicting a prediction image $P(d_{min2})$ corresponding to each input elemental image Y of the second input EIA 10_5; and a merger configured to merge the first and second movement information $d_{min1}$ and $d_{min2}$ to generate a disparity map.

17. The lifting transform apparatus of claim 16, wherein the first predictor comprises:

an extractor configured to extract the plurality of reference elemental images S, disposed as a cross type with respect to the input elemental image X, from the first reference EIA 10_1;

an overlapping unit configured to move the plurality of reference elemental images S on the basis of the amount of movement determined within a limited range and allow the plurality of reference elemental images S moved based on the amount of movement to overlap, thereby generating a plurality of prediction images $P(d_1)$; and a prediction image selector configured to select a prediction image $P(d_{min1})$, where difference energy with the input elemental image X is lowest, from among the plurality of prediction images $P(d_1)$ and generate, as the first movement information $d_{min1}$, the amount of movements of the plurality of reference elemental images S used to generate the selected prediction image $P(d_{min1})$.

18. The lifting transform apparatus of claim 17, further comprising a flipping processor, wherein, in a case where a plurality of prediction images $P(d_1)$ are generated by allowing a plurality of flipped reference elemental images S to overlap, the flipping processor marks a negative sign on the first movement information $d_{min1}$ input from the prediction image selector to generate the plurality of prediction images $P(d_1)$.

19. The lifting transform apparatus of claim 16, wherein the second predictor comprises:

an extractor configured to extract the plurality of reference elemental images D, disposed as a diagonal type with respect to the input elemental image Y, from the first reference EIA 10_1;

an overlapping unit configured to move the plurality of reference elemental images D on the basis of the amount of movement determined within a limited range and allow the plurality of reference elemental images D moved based on the amount of movement to overlap, thereby generating a Plurality of prediction images $P(d_2)$; and a prediction image, selector configured to select a prediction image $P(d_{min2})$, Where difference energy with the input elemental image Y is lowest, from among the plurality of prediction images $P(d_2)$ and generate, as the second movement information $d_{min2}$, the amount of movements of the plurality of reference elemental images D used to generate the selected prediction image $P(d_{min2})$.

* * * * *